Jan. 16, 1968  E. R. THAU ETAL  3,363,488
ALIGNMENT JIG FOR REMOVING STUDS FROM TRUCK HUBS
Filed Sept. 23, 1965
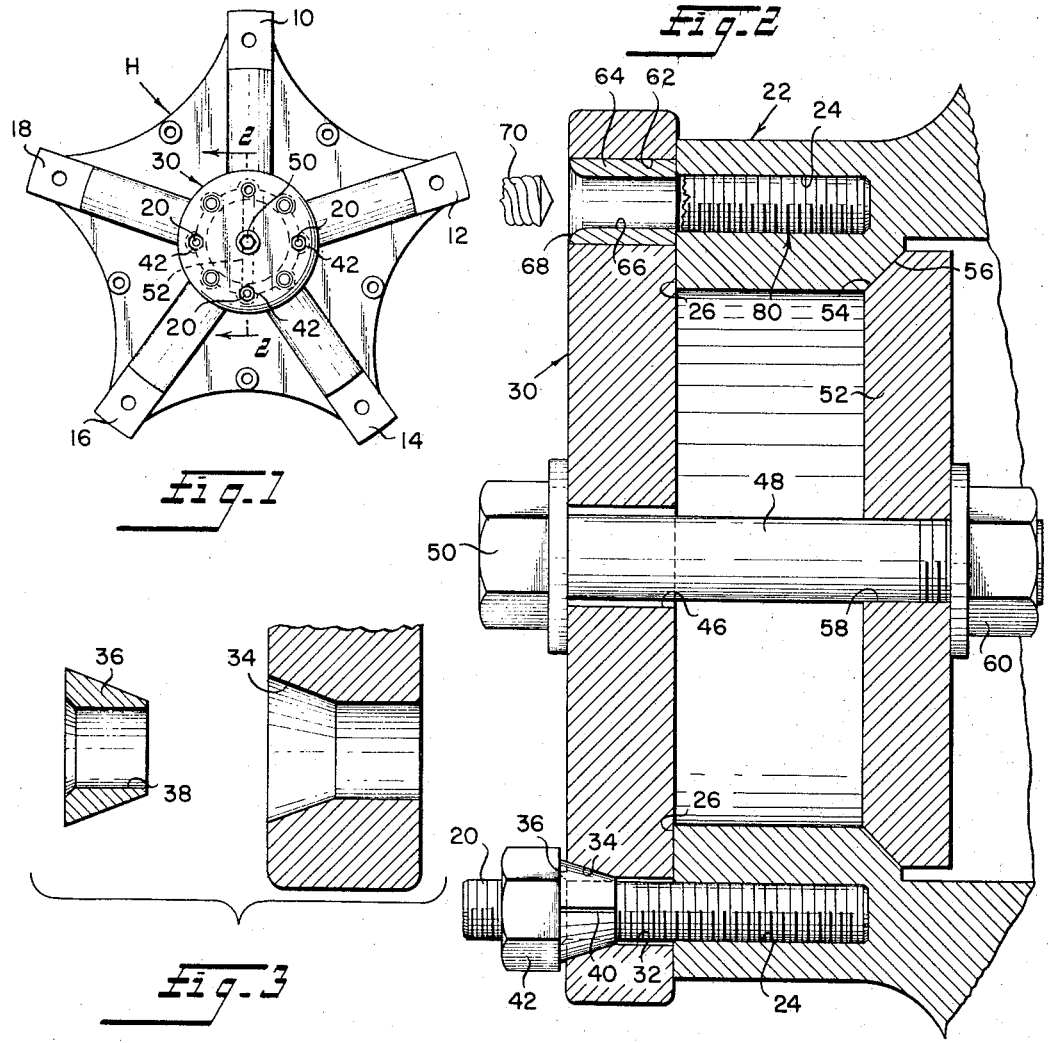
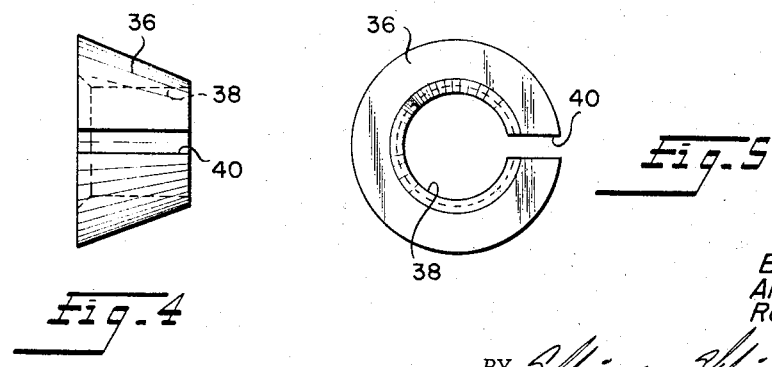
INVENTORS
Edmund R. Thau
Albert Wagner
Robert Dawson
BY *Schlesinger, Schlesinger & Arkwright*
ATTORNEYS

[Patent No.] 3,363,488
Patented Jan. 16, 1968

3,363,488
ALIGNMENT JIG FOR REMOVING STUDS FROM TRUCK HUBS
Edmund R. Thau, Rte. 2, Box 168, Annapolis, Md. 21401; Albert Wagner, 810 Glen View Ave., Glen Burnie, Md. 21061; and Robert Dawson, Manhattan Beach, Severna Park, Md. 21146
Filed Sept. 23, 1965, Ser. No. 489,684
5 Claims. (Cl. 77—62)

ABSTRACT OF THE DISCLOSURE

A jig assembly for drilling out broken axle studs from a wheel hub, having a positioning plate with a plurality of circumferentially disposed stud receiving holes to be fitted on a wheel hub so that the studs project therethrough; stud receiving hole diameters are greater than that of the studs to allow for variation in stud location on different hubs; section of the holes adjacent the outer edge is tapered to receive a split tapered outer surface adjusting bushing which is fitted over a plurality of studs and into the tapered section of the passage to accurately align a drill hole containing a drill guide bushing directly over, and in registry with, a broken stud.

---

This invention relates to the removal of broken axle studs from a truck wheel hub.

In large trucks having dual rear wheels, the axle studs thereon are frequently broken, and when this occurs, it is necessary to drill out the broken stud and replace it. The operation normally involves removal of the dual wheel hub and the special alignment of a drill so that the broken stud can be drilled out without damaging the threaded hole in which it is set.

The operation normally consumes a considerable amount of time, since extremely accurate alignment is necessary. The time required for drilling out a single stud under the usual practice is approximately fifteen (15) minutes.

The need for a special jig arrangement to cut down the time necessary to drill out broken studs has been a problem confronting the truck industry for many years.

The present invention contemplates the use of a very simple jig assembly which eliminates the need to remove the wheel from the truck, and very quickly aligns a hand drill with the center line of the broken stud so that it can be removed quickly. The jig fixture takes advantage of the accurate alignment of the circumferentially spaced axle studs with respect to each other so that a drill guide bushing is placed in accurate alignment for guiding a hand drill. There are circumferentially spaced holes in a guide plate which enable the operator to quickly place the plate over the circumferentially spaced holes. The holes are made slightly larger than the diameter of the studs, and special tapered bushings which are fitted over the studs are used to take up the clearance between the guide plate holes and the studs. In this manner, the bushings take up any small variation in placement of the circumferential studs from one hub to another.

Accordingly, it is an object of this invention to provide a jig assembly for drilling out broken studs from a dual wheel truck hub in a quick and simple manner.

It is a still further object of this invention to provide a simple jig assembly which permits the drilling of axle studs from a wheel hub without removing the wheel from the truck.

It is a still further object of this invention to provide a simple jig assembly which takes advantage of the accurate positioning of the axle studs on a truck wheel hub to position a drill guide bushing in accurate alignment with the center line of a broken stud.

It is a still further object of this invention to provide a jig assembly which enables one man to accurately drill out a broken stud in a very short period of time without using any special drilling equipment.

It is a still further object of this invention to provide a jig assembly for drilling out truck studs which consists of a compact assembly requiring only a few pieces, and which can easily be used by an operator under the truck itself.

A still further object of this invention is to provide a jig fixture which is simple and yet is extremely accurate, retaining the accuracy of alignment to within several thousandths of an inch, while yet retaining sufficient flexibility for use from one hub to another to take up for the variation in location of studs.

Other and further objects of this invention will become apparent from the following description of the preferred embodiment thereof, reference being had to the accompanying drawings, in which:

FIGURE 1 shows a front elevation of a dual wheel spoke-type truck hub with the alignment device of the instant invention mounted thereon;

FIGURE 2 is a cross sectional view along the line 2—2 of FIGURE 1 as showing in partial section the jig assembly mounted in position on the hub;

FIGURE 3 shows an exploded cross sectional view of one section of the plate showing a conical hole at the outside edge thereof, and a cross section of the adjustable conical bushing which fits therein;

FIGURE 4 shows a side elevation of the conical guide bushing; and

FIGURE 5 shows a face view of the guide bushing.

Referring particularly to the drawings, FIGURE 1 shows an annulus spoke type axle engaging hub which supports an annular tire rim for dual rear wheels of a truck.

The radial disposed tire rim supporting spokes of hub H are shown at 10, 12, 14, 16 and 18 of FIGURE 1. A plurality of circumferentially disposed axle engaging studs 20 project from the annular axle engaging section 22. Annular section 22 has a plurality of threaded circumferentially disposed openings 24 into which the studs 20 are received, as shown in FIGURE 2.

The jig assembly of the instant invention is shown mounted in position in both FIGURES 1 and 2. The positioning plate 30 is shown mounted over the annular section 22 of the hub. A plurality of circumferentially spaced openings 32 are bored through the positioning plate 30 and are spaced so that they are aligned with the studs 20 of the hub unit. Studs 20 as shown in the lower section of FIGURE 2 and as generally indicated in FIGURE 1, project through the openings 32.

The outer section of the openings 32 are tapered as shown at 34 in FIGURE 3 to accommodate an adjustable conical bushing member 36 as can been in FIGURES 2 and 3. The conical adjusting bushing has a central opening 36 through which the studs 20 project.

FIGURE 3 shows an exploded view of the conical adjusting bushing 36 and the matching section of the positioning plate 30. The assembly of the adjusting bushing is shown in the lower section of FIGURE 2.

The adjusting bushing 36 as shown in FIGURE 5 has a slot 40 cut therein.

The lower portion of FIGURE 2 shows the assembled positioning plate 30 with a stud 20 projecting through an opening 32 in the positioning plate 30. The conical adjusting bushing 36 is shown in position mounted over the stud and fitted into the conical opening 34 of the positioning plate 30. A nut 42 is threadedly mounted on a stud 20 and holds the bushing 36 and a positioning plate 30 in firm position against the annular section 22 of the hub.

The positioning plate 30 has a large central opening 46 through which the shank 48 of bolt 50 projects.

A rear retaining plate 52 having a tapered engaging surface 54 engages the corresponding tapered surface 56 of the interior section of the annular hub section 22. A central opening 58 accommodates the end of the shank 48 of bolt 50 and is secured to the hub by the tightening of the nut 60.

A positioning plate 30 has a special opening 62 shown in the top portion of FIGURE 2 which accommodates a drill guide bushing 64 which is press-fitted therein. The drill guide bushing is made of hardened steel and has an internal diameter 66 which is slightly smaller than the diameter of the openings 24 in the annular hub section 22. A tapered end section 68 on the bushing assists in guiding a drill 70 into the annular opening 66 and into registry with the broken stud 80.

*Operation*

The drilling out of a broken stud from a truck wheel hub is accomplished by first disconnecting all of the axle studs from the axle itself and dropping the axle clear of the hub unit. The operator then places the positioning plate 30 over the studs registering the circumferentially spaced openings 32 in alignment with the stud members, and the drill guide bushing in alignment with the broken stud.

Sufficient clearance between the periphery of the holes 32 and the studs is provided to allow for variation in position of the studs for all hub units. The studs themselves are usually placed very accurately on center, but there is a variation of up to 10 thousandths of an inch for these units. The play between the stud and the periphery of the holes 32 is taken up by the conical adjusting members, which are received into the tapered holes at the outer portion of the stud receiving holes 32.

After placing the positioning plate 30 on the hub, the operator takes at least 3 conical adjusting bushings 36 and places them over the studs and into the conical receiving opening 34 shown in FIGURES 2 and 3. The nuts 42 are then screwed on the studs and tightened to hold the positioning plate 30 in firm position on the hub.

With the positioning plate 30 firmly in position, the operator is ready to drill out the broken stud which is aligned with the drill guide bushing 64.

The drill guide bushing is made of hardened steel and has an internal diameter only several thousandths larger than the drill used. It will be noted that the bore 66 of the drill guide bushing is smaller than the external diameter of the stud. The drill itself is used to drill out the core of the broken studs, leaving the threaded section in the threads of the stud receiving hole 24. This is subsequently removed by hand after the jig assembly is removed.

The rear plate 52 used with the bolt 50 is used in those instances where there are no studs upon which the plate can be supported. This is rather uncommon, but these instances do occur. In these cases the plate is first placed in position on the hub, with the bolt 50 being placed through the opening 46 and the positioning plate 30 and through the opening 58 in the rear guide plate 52. The nut 60 is then tightened to hold the positioning plate 30 firmly in position with the drill guide bushing 64 aligned with the broken stud to be drilled out.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

Having thus described our invention, we claim the following:

1. A jig assembly for drilling out broken axle studs from a truck wheel hub, comprising:
    (a) a positioning plate having a pluraltiy of circumferentially disposed stud receiving holes therethrough which is fitted on said hub with the studs projecting through said stud receiving holes;
    (b) the diameter of said holes being sufficiently greater than that of said studs to accommodate maximum variation in stud location on different hub units;
    (c) guide means on said plate for accurately positioning a drill with respect to the center line of a broken stud on said hub; and
    (d) adjusting means for taking up the play between the periphery of said holes and said projecting stud members.

2. The jig assembly for drilling out broken axle studs as set forth in claim 1, wherein:
    (a) said stud receiving holes are tapered outwardly adjacent the surface of the positioning plate disposed furthest from the hub member; and
    (b) said adjusting means is a plurality of guide bushings having an external conical shape which are received in the tapered section of said stud receiving holes.

3. The jig assembly for drilling out broken axle studs as set forth in claim 2, wherein:
    (a) said conical guide bushings are split longitudinally, and have an internal diameter several thousandths greater than the diameter of said studs.

4. A jig assembly for drilling out broken axle studs from a truck wheel hub, comprising:
    (a) support means for engaging and accurately aligning with at least three circumferentially disposed axle engaging studs on a truck wheel hub;
    (b) drill guide means on said support means for accurately guiding a drill so that a broken stud can be drilled out without damaging the stud hole; and
    (c) said support means includes adjusting means for allowing for small but critical variation in stud location on each hub unit.

5. The jig assembly for drilling out broken axle studs from a truck wheel hub as set forth in claim 4, wherein:
    (a) said adjusting means includes stud engaging sleeves which compensate for up to 10-thousandths of an inch variation in stud location.

References Cited

UNITED STATES PATENTS

| | | | |
|---|---|---|---|
| 1,597,468 | 8/1926 | Holehouse | 77—62 |
| 2,408,450 | 10/1946 | Schrader | 81—71 |

FRANCIS S. HUSAR, *Primary Examiner.*